(12) United States Patent
Li et al.

(10) Patent No.: US 12,271,302 B2
(45) Date of Patent: Apr. 8, 2025

(54) METHOD, SYSTEM AND APPARATUS FOR DATA TRANSMISSION, AND STORAGE MEDIUM

(71) Applicant: SUZHOU METABRAIN INTELLIGENT TECHNOLOGY CO., LTD., Jiangsu (CN)

(72) Inventors: Xingyuan Li, Jiangsu (CN); Jiang Wang, Jiangsu (CN); Huajin Sun, Jiangsu (CN); Shuqing Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,093

(22) PCT Filed: Mar. 24, 2023

(86) PCT No.: PCT/CN2023/083570
§ 371 (c)(1),
(2) Date: Jun. 25, 2024

(87) PCT Pub. No.: WO2024/001338
PCT Pub. Date: Jan. 4, 2024

(65) Prior Publication Data
US 2024/0419586 A1    Dec. 19, 2024

(30) Foreign Application Priority Data

Jun. 30, 2022  (CN) .......................... 202210759837.9

(51) Int. Cl.
G06F 13/24  (2006.01)
G06F 12/02  (2006.01)
G06F 13/42  (2006.01)

(52) U.S. Cl.
CPC .......... *G06F 12/0246* (2013.01); *G06F 13/24* (2013.01); *G06F 13/4221* (2013.01)

(58) Field of Classification Search
None
See application file for complete search history.

(56) References Cited

U.S. PATENT DOCUMENTS 9,430,412 B2 *   8/2016  Huang ................ G06F 12/0835
10,120,832 B2 *  11/2018  Raindel .............. G06F 13/4221
(Continued)

FOREIGN PATENT DOCUMENTS

CN    102830942 A    12/2012
CN    103455283 A    12/2013
(Continued)

OTHER PUBLICATIONS

International Search Report with Written Opinion received for PCT Serial No. PCT/CN2023/083570 (May 24, 2023).
(Continued)

*Primary Examiner* — Elias Mamo
(74) *Attorney, Agent, or Firm* — Merchant & Gould P.C.

(57) ABSTRACT

Disclosed are a method, system and apparatus for data transmission, and a storage medium, which relate to the field of data transmission, and are used for transmitting data. Address mapping logic is provided in a storage array card, and a host maps a storage address space thereof to the storage array card by the address mapping logic of the storage array card; and after a data transmission instruction is sent to an NVMeSSD by a hard disk control mapping address in the storage array card, the NVMeSSD can directly perform data transmission on the basis of the data transmission instruction and a host storage mapping address in the
(Continued)

storage array card, that is, the NVMeSSD can directly perform data transmission with the storage address space inside the host.

20 Claims, 8 Drawing Sheets

(56) References Cited

U.S. PATENT DOCUMENTS

| | | | |
|---|---|---|---|
| 2018/0212859 A1 | 7/2018 | Li et al. | |
| 2018/0307558 A1* | 10/2018 | Chen | ........................ G06F 11/14 |
| 2021/0064293 A1* | 3/2021 | Cho | ...................... G06F 3/0673 |

FOREIGN PATENT DOCUMENTS

| | | |
|---|---|---|
| CN | 108549610 A | 9/2018 |
| CN | 108563401 A | 9/2018 |
| CN | 110895445 A | 3/2020 |
| CN | 111538460 A | 8/2020 |
| CN | 114817093 A | 7/2022 |

OTHER PUBLICATIONS

Chinese Search Report received for Chinese Application No. 2022107598379.
Chinese Search Report 2 received for Chinese Application No. 2022107598379 (Aug. 24, 2022).

* cited by examiner

METHOD, SYSTEM AND APPARATUS FOR DATA TRANSMISSION, AND STORAGE MEDIUM

CROSS-REFERENCE TO RELATED APPLICATION

The present disclosure is a national stage filing under 35 U.S.C. § 371 of international application number PCT/CN2023/083570, filed Mar. 24, 2023, which claims priority to Chinese patent application No. CN 202210759837.9, filed to the China National Intellectual Property Administration on Jun. 30, 2022 and entitled "Method, System and Apparatus for Data Transmission, and Storage Medium", which is incorporated herein by reference in its entirety.

TECHNICAL FIELD

The present disclosure relates to the field of data transmission, and in particular, to a method, system and apparatus for data transmission, and a storage medium.

BACKGROUND

In the related art, when a host performs data transmission with an SAS (Serial Attached SCSI)/SATA (Serial Advanced Technology Attachment) hard disk, it is necessary to provide an RAID (Redundant Arrays of Independent Disks) storage array card between the host and the SAS/SATA hard disk. In addition, a RAID controller includes a control module and a data transmission module; after the control module receives a control signal sent by the host, if data to be transmitted does not require RAID check calculation, data transmission can be directly performed between the host and the hard disk via a data transmission channel.

However, if IOPS (Input/Output Operations Per Second) of the hard disk is large, e.g. an NVMe (Non-Volatile Memory express) hard disk, the hard disk and the RAID controller need to be connected via a PCIe (Peripheral component interconnect express) bus. However, the control module in the RAID controller cannot control direct data transmission between the NVMe hard disk and the host, and needs to perform buffering first by its own RAID DRAM (Dynamic Random Access Memory); but due to a time delay caused during buffering and a bandwidth limitation of the RAID DRAM itself, RAID in the related art cannot achieve direct data transmission between the host and the NVMe hard disk, and cannot satisfy performance requirements of the NVMe hard disk.

SUMMARY

An object of some embodiments of the present disclosure is to provide a method, system and apparatus for data transmission, and a storage medium, in which it is unnecessary to perform an intermediate data transmission instruction processing process on a storage array card, and it is also unnecessary to perform an intermediate data moving process on the storage array card, and data can be directly transmitted between a host and an NVMeSSD, thereby increasing the efficiency of data transmission and reducing the performance requirements of the storage array card.

In order to solve the described technical problem, some embodiments of the present disclosure provide a method for data transmission, which is applied to a host in a data transmission apparatus, wherein the apparatus for data transmission includes a host, a storage array card and NVMeSSDs which are connected in sequence, wherein connection between the host and the storage array card and connection between the storage array card and the NVMeSSDs are achieved via PCIe buses; the storage array card includes address mapping logic, each NVMeSSD maps its own control address space to the storage array card by the address mapping logic of the storage array card, and the mapped control address space is a hard disk control mapping address; the method includes:
  one's own storage address space is mapped to the storage array card by the address mapping logic of the storage array card, wherein the mapped storage address space is a host storage mapping address; and
  a data transmission instruction is sent to the NVMeSSD by the hard disk control mapping address in the storage array card, such that the NVMeSSD performs data transmission on the basis of the data transmission instruction and the host storage mapping address in the storage array card.

In an embodiment, the storage array card further includes interrupt mapping logic;
  before the data transmission instruction is sent to the NVMeSSD by the hard disk control mapping address in the storage array card, such that the NVMeSSD performs data transmission on the basis of the data transmission instruction and the host storage mapping address in the storage array card, the method further includes:
  one's own interrupt signal address space is mapped to the storage array card by the interrupt mapping logic of the storage array card, wherein the mapped interrupt signal address space is a host interrupt signal mapping address; and
  after the data transmission instruction is sent to the NVMeSSD by the hard disk control mapping address in the storage array card, such that the NVMeSSD performs data transmission on the basis of the data transmission instruction and the host storage mapping address in the storage array card, the method further includes:
  after an interrupt signal is written to the host interrupt signal mapping address by the interrupt mapping logic at the NVMeSSD, the interrupt signal is processed.

In an embodiment, before the data transmission instruction is sent to the NVMeSSD by the hard disk control mapping address in the storage array card, such that the NVMeSSD performs data transmission on the basis of the data transmission instruction and the host storage mapping address in the storage array card, the method further includes:
  an I/O queue is established, and a base address of the I/O queue is mapped to the storage array card by means of the address mapping logic of the storage array card;
  the data transmission instruction is sent to the NVMeSSD by the hard disk control mapping address, such that the NVMeSSD acquires, from the I/O queue, a data transmission command corresponding to the data transmission instruction, and transmits data corresponding to the data transmission command to the host storage mapping address corresponding to the data transmission command; and
  after the interrupt signal is written to the host interrupt signal mapping address by the interrupt mapping logic at the NVMeSSD, the interrupt signal is processed, including:
  at the NVMeSSD, the I/O queue is enabled, and the interrupt signal is processed when the interrupt signal is written to the host interrupt signal mapping address by the interrupt mapping logic.

In an embodiment, the I/O queue includes a command completion queue and a command submission queue;

the data transmission instruction is sent to the NVMeSSD by the hard disk control mapping address, such that the NVMeSSD acquires, from the I/O queue, the data transmission command corresponding to the data transmission instruction, and transmits data corresponding to the data transmission command to the host storage mapping address corresponding to the data transmission command, including the data transmission instruction is sent to the NVMeSSD by the hard disk control mapping address, such that the NVMeSSD acquires, from the command submission queue, the data transmission command corresponding to the data transmission instruction, and transmits data corresponding to the data transmission command to the host storage mapping address corresponding to the data transmission command; and at the NVMeSSD, the I/O queue is enabled, and the interrupt signal is processed when the interrupt signal is written to the host interrupt signal mapping address by the interrupt mapping logic, including:

at the NVMeSSD, the command completion queue is enabled, and the interrupt signal is processed when the interrupt signal is written to the host interrupt signal mapping address by the interrupt mapping logic.

In an embodiment, before the data transmission instruction is sent to the NVMeSSD by the hard disk control mapping address, such that the NVMeSSD acquires, from the command submission queue, the data transmission command corresponding to the data transmission instruction, and transmits data corresponding to the data transmission command to the host storage mapping address corresponding to the data transmission command, the method further includes:

various data transmission commands are written into the command submission queue.

In an embodiment, the storage array card further includes hard disk control logic, configured to establish a management command queue for the NVMeSSD on the basis of the I/O queue;

the data transmission instruction is sent to the NVMeSSD by the hard disk control mapping address, such that the NVMeSSD acquires, from the I/O queue, the data transmission command corresponding to the data transmission instruction, and transmits data corresponding to the data transmission command to the host storage mapping address corresponding to the data transmission command, including:

after the storage array card establishes the management command queue for the NVMeSSD, the data transmission instruction is sent to the NVMeSSD by the hard disk control mapping address, such that the NVMeSSD acquires, from the I/O queue, a data transmission command corresponding to the data transmission instruction on the basis of the management command queue, and transmits data corresponding to the data transmission command to the host storage mapping address corresponding to the data transmission command; and at the NVMeSSD, the I/O queue is enabled, and the interrupt signal is processed when the interrupt signal is written to the host interrupt signal mapping address by the interrupt mapping logic, including:

after the storage array card establishes the management command queue for the NVMeSSD, the I/O queue is enabled at the NVMeSSD by the management command queue, and the interrupt signal is processed when the interrupt signal is written to the host interrupt signal mapping address by the interrupt mapping logic.

In an embodiment, before the data transmission instruction is sent to the NVMeSSD by the hard disk control mapping address in the storage array card, such that the NVMeSSD performs data transmission on the basis of the data transmission instruction and the host storage mapping address in the storage array card, the method further includes:

when the data transmission instruction is a write data instruction, it is determined whether data corresponding to the write data instruction is data to be checked;

if the data corresponding to the write data instruction is data to be checked, the write data instruction is sent to the storage array card, such that the storage array card receives and checks the data corresponding to the write data instruction in the host, and writes the checked data corresponding to the write data instruction into the NVMeSSD; and if the data corresponding to the write data instruction is not data to be checked, the step that the data transmission instruction is sent to the NVMeSSD by the hard disk control mapping address in the storage array card, such that the NVMeSSD performs data transmission on the basis of the data transmission instruction and the host storage mapping address in the storage array card is entered.

In an embodiment, the apparatus for data transmission includes a plurality of NVMeSSDs connected to the storage array card;

before the data transmission instruction is sent to the NVMeSSD by the hard disk control mapping address in the storage array card, such that the NVMeSSD performs data transmission on the basis of the data transmission instruction and the host storage mapping address in the storage array card, the method further includes:

when the data transmission instruction is a read data instruction, it is determined whether data corresponding to the read data instruction is data to be checked;

in the case that the data is data to be checked, it is determined whether each NVMeSSD connected to the storage array card is in a normal state;

in the case that the data is not data to be checked or each NVMeSSD is in the normal state, the read data instruction is sent to a target NVMeSSD by the hard disk control mapping address in the storage array card, such that the target NVMeSSD writes data corresponding to the read data instruction into the host storage mapping address in the storage array card;

in the case that not all the NVMeSSDs are in the normal state, it is determined whether the target NVMeSSD is in the normal state;

in the case that the target NVMeSSD is in the normal state, the read data instruction is sent to the target NVMeSSD by the hard disk control mapping address in the storage array card, such that the target NVMeSSD writes data corresponding to the read data instruction into the host storage mapping address in the storage array card; and in the case that the target NVMeSSD is not in the normal state, the read data instruction is sent to the storage array card, such that the storage array card receives and checks data corresponding to the read data instruction in the target NVMeSSD, and sends the checked data corresponding to the read data instruction to the host.

In order to solve the described technical problem, some embodiments of the present disclosure provide a system for data transmission, which is applied to a host in an apparatus for data transmission, wherein the apparatus for data transmission includes a host, a storage array card and NVMeSSDs which are connected in sequence, wherein connection between the host and the storage array card and connection between the storage array card and the NVMeSSDs are achieved via PCIe buses; the storage array card includes address mapping logic, each NVMeSSD maps its own control address space to the storage array card by the address mapping logic of the storage array card, and the mapped control address space is a hard disk control mapping address; the system includes:

an address translation unit, configured to map one's own storage address space to the storage array card by the address mapping logic of the storage array card, wherein the mapped storage address space is a host storage mapping address; and and an instruction sending unit, configured to send a data transmission instruction to the NVMeSSD by the hard disk control mapping address in the storage array card, such that the NVMeSSD performs data transmission on the basis of the data transmission instruction and the host storage mapping address in the storage array card.

In order to solve the described technical problem, some embodiments of the present disclosure provide an apparatus for data transmission, including:

a memory, for storing a computer program; and
a host, for implementing steps of the described method for data transmission when executing the computer program.

In an embodiment, the apparatus further includes:
a storage array card, connected to the host via a PCIe bus, and configured to receive a host storage mapping address of the host and a hard disk control mapping address of each NVMeSSD; and NVMeSSDs, connected to the storage array card via PCIe buses, and configured to store data and perform data transmission with the host on the basis of the host storage mapping address in the storage array card.

In an embodiment, the storage array card includes address mapping logic, which is specifically configured to receive, by the address mapping logic, a storage address space mapped by the host, and receive, by the address mapping logic, a control address space mapped by the NVMeSSD.

In an embodiment, the storage array card further includes interrupt mapping logic, which is further configured to receive an interrupt signal address space of the host by the interrupt mapping logic.

In an embodiment, the storage array card further includes hard disk control logic, which is configured to establish a management command queue for the NVMeSSD after receiving an I/O queue established by the host, such that the NVMeSSD acquires, from the I/O queue, a data transmission command corresponding to a data transmission instruction on the basis of the management command queue, or enable the I/O queue on the basis of the management command queue.

In an embodiment, the I/O queue includes a command completion queue and a command submission queue;

the NVMeSSD is specifically configured to store data, acquire a data transmission command corresponding to the data transmission instruction from the command submission queue on the basis of the management command queue, or enable the command completion queue on the basis of the management command queue, so as to perform data transmission with the host.

In order to solve the described technical problem, some embodiments of the present disclosure provide a non-transitory readable storage medium; the non-transitory readable storage medium stores a computer program, and when the computer program is executed by a processor, steps of the method for data transmission are implemented.

Some embodiments of the present disclosure provide a method, system and apparatus for data transmission, and a storage medium, which relate to the field of data transmission, and are used for transmitting data. Address mapping logic is provided in a storage array card, and a host maps a storage address space thereof to the storage array card by the address mapping logic of the storage array card; after a data transmission instruction is sent to an NVMeSSD by a hard disk control mapping address in the storage array card, the NVMeSSD can directly perform data transmission on the basis of the data transmission instruction and a host storage mapping address in the storage array card, that is, the NVMeSSD can directly perform data transmission with the storage address space inside the host. Hence, in some embodiments of the present disclosure, it is unnecessary to perform an intermediate data transmission instruction processing process on the storage array card, and it is also unnecessary to perform an intermediate data moving process on the storage array card, and data can be directly transmitted between the host and the NVMeSSD, thereby increasing the efficiency of data transmission and reducing the performance requirements of the storage array card.

BRIEF DESCRIPTION OF THE DRAWINGS

In order to describe the technical solutions in embodiments of the present disclosure more clearly, hereinafter, accompanying drawings requiring to be used for describing the related art and the embodiments are introduced briefly. Apparently, the accompanying drawings in the following description merely relate to some embodiments of the present disclosure, and for a person of ordinary skill in the art, other accompanying drawings can also be obtained according to these accompanying drawings without involving any inventive effort.

DETAILED DESCRIPTION OF THE EMBODIMENTS

The core of some embodiments of the present disclosure is to provide a method, system and apparatus for data transmission, and a storage medium, in which it is unnecessary to perform an intermediate data transmission instruction processing process on a storage array card, and it is also unnecessary to perform an intermediate data moving process on the storage array card, and data can be directly transmitted between a host 92 and an NVMeSSD, thereby increasing the efficiency of data transmission and reducing the performance requirements of the storage array card.

To make the objects, technical solutions and advantages of embodiments of the present disclosure clearer, hereinafter, the technical solutions in some embodiments of the present disclosure will be described clearly and thoroughly in combination with the accompanying drawings in the embodiments of the present disclosure. Apparently, the embodiments as described are merely some rather than all of the embodiments of the present disclosure. All other embodiments obtained by a person of ordinary skill in the art on the basis of the embodiments of the present disclosure without any inventive effort shall all fall within the scope of protection of the present disclosure.

Figure 1:
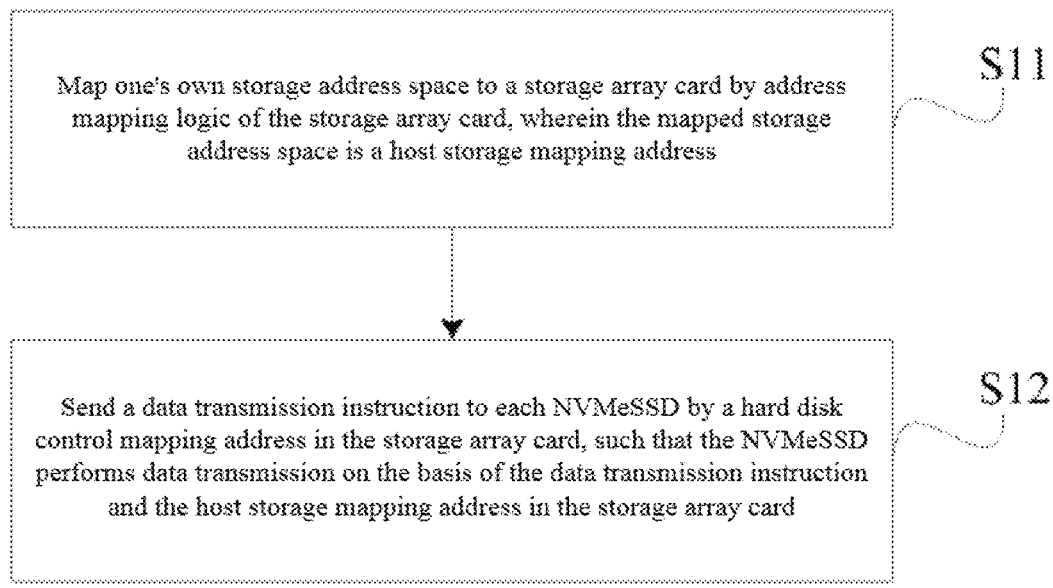
FIG. 1 is a schematic flowchart of a method for data transmission provided according to the present disclosure.

Please refer to FIG. 1, FIG. 1 is a schematic flowchart of a method for data transmission provided according to the present disclosure. The method for data transmission is applied to a host 92 in an apparatus for data transmission, wherein the apparatus for data transmission includes a host 92, a storage array card and NVMeSSDs which are connected in sequence, wherein connection between the host 92 and the storage array card and connection between the storage array card and the NVMeSSDs are achieved via PCIe buses; the storage array card includes address mapping logic, each NVMeSSD maps its own control address space to the storage array card by the address mapping logic of the storage array card, and the mapped control address space is a hard disk control mapping address; the method includes:

S11: one's own storage address space is mapped to the storage array card by the address mapping logic of the storage array card, wherein the mapped storage address space is a host storage mapping address.

Figure 2:
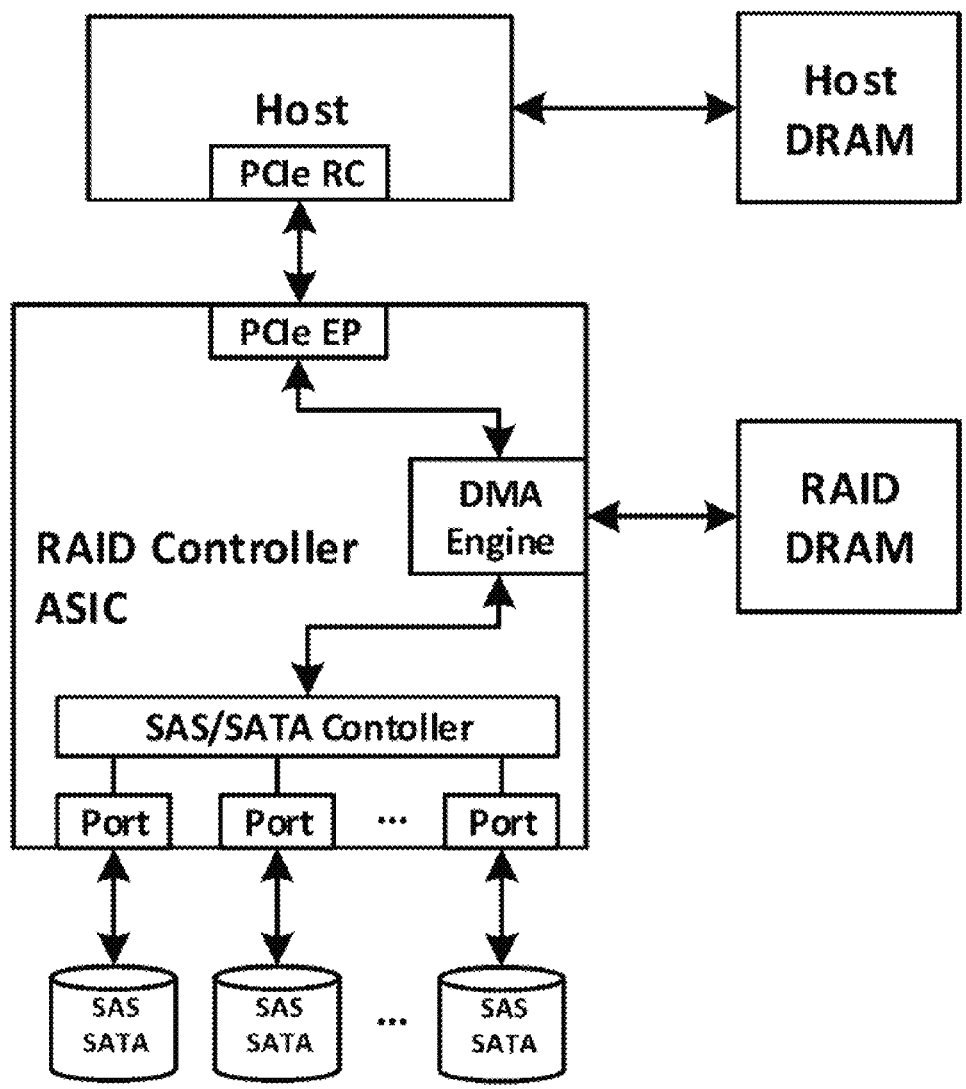
FIG. 2 is a schematic diagram of a connection structure of an RAID controller in the related art.

In an embodiment, considering that an RAID disk redundant array technology in the related art combines a plurality of disk devices to form one or more storage array groups, to improve the storage performance and increase redundancy so as to protect data, the core of a conventional RAID system is an RAID controller chip, and an RAID controller achieved by hardware ensures performance, reliability, and data security. The conventional RAID controller is generally connected to an SAS or SATA mechanical hard disk or SSD (Solid State Disk). Specifically, an upstream of the RAID controller is connected to the host 92 via a PCIe bus, and a downstream thereof is connected to a plurality of SAS/SATA hard disks via an SAS/SATA controller. Please refer to FIG. 2, FIG. 2 is a schematic diagram of a connection structure of the RAID controller in the related art. Host is a host 92, Host DRAM is a storage address space of the host 92, RAID Controller ASIC is an RAID controller chip, DMA Engine is a DMA controller and is used for storing buffer data of the RAID controller, SAS/SATA controller is an SAS/SATA controller, and the SAS/SATA controller includes a plurality of Ports so as to be connected to a plurality of SAS/SATA hard disks. If data to be transmitted does not require RAID check calculation, e.g. RAID0/1 read/write or RAID5/6 non-degraded read, the DMA controller inside the RAID controller may directly achieve direct data moving between the hard disks and the storage address space of the host 92 without accessing an RAID-DRAM cache, thereby reducing I/O delay, improving the performance of data transmission, and reducing the performance requirements for the RAIDDRAM.

However, with the update of technologies, a current hard disk may use an NVMe interface, that is, an NVMeSSD, and the NVMe interface greatly releases the performance advantage of an NANDFlash storage medium. The IOPS of a conventional SAS/SATA hard disk is generally only tens to over two hundred, and even for an SSD of an SAS/SATA interface, the IOPS thereof is also only thousands to tens of thousands, with a maximum of no more than a range above one hundred thousand and below two hundred thousand. However, the IOPS of an NVMeSSD starts from hundreds of thousands, and the IOPS of an NVMeSSD of a PCIe4.0 interface can reach one million or more, while the IOPS of an NVMeSSD of a future PCIe5.0 interface can reach three million or more. Furthermore, as the NVMeSSD directly uses PCIe as an I/O interface thereof, the conventional RAID controller cannot directly move data of the NVMeSSD, unless a high-speed I/O interface or a high-speed processor is used, which undoubtedly causes a huge increase in implementation costs of the RAID controller. Or when the RAID controller serves as an intermediate device and performs data transmission between the NVMeSSD and the host 92, data of the host 92 or data of the NVMeSSD is first stored into the RAIDDRAM and then sent to the NVMeSSD or the host 92, which undoubtedly causes a high delay during data transmission and requires extremely high access bandwidth of the RAIDDRAM. In fact, due to the bandwidth limitation of the RAIDDRAM, the RAID controller in the related art cannot meet the performance requirements of the NVMeSSD.

In order to solve the described technical problems, in some embodiments, the storage array card is connected to the host 92 via a PCIe bus, and the storage array card is also connected to the NVMeSSDs via a PCIe bus. In addition, address mapping logic is provided in the storage array card, and the host 92 can map a storage address space thereof to the storage array card via the address mapping logic. Moreover, the host 92 may first translate the storage address space thereof into a host storage mapping address, and then send same to the storage array card, or directly map the storage address space thereof into the storage array card, and then the storage array card translates the storage address space of the host 92 into the host storage mapping address, which is not limited in some embodiments of the present disclosure.

S12: A data transmission instruction is sent to the NVMeSSD by the hard disk control mapping address in the storage array card, such that the NVMeSSD performs data transmission on the basis of the data transmission instruction and the host storage mapping address in the storage array card.

The NVMeSSD may further map its own control address space to the storage array card by the address mapping logic of the storage array card. When the host 92 needs to write data into the NVMeSSD or read data from the NVMeSSD, a data transmission instruction may be written into the hard disk control mapping address in the storage array card. In fact, the host 92 directly writes the data transmission instruction into the control address space of the NVMeSSD, for example, into a Doorbell register of the NVMeSSD. In this case, the NVMeSSD controller inside the NVMeSSD can directly read the data transmission instruction from its own control address space, and an address pointer of the data transmission instruction points to the host storage mapping address, mapped by the address mapping logic, of the host 92, which also ensures the accuracy of the location of data transmission between the host and the NVMeSSD, and the address of writing a data transmission command into the NVMeSSD by the host 92 is also the hard disk control mapping address, subjected to the address mapping logic, of the NVMeSSD. The controller inside the NVMeSSD writes data of its own storage address space into the host storage mapping address according to the data transmission instruction. Actually, the NVMeSSD directly writes data of its own storage address space into the storage address space of the host 92, such that the host 92 directly reads data in the NVMeSSD to its own storage address space, or the NVMeSSD reads data from the host storage mapping address according to the data transmission instruction, and writes same into its own storage address space. Actually, the NVMeSSD directly moves the data in the storage address space of the host 92 to its own storage address space, such that the host 92 directly writes data of its own storage address space into the NVMeSSD.

It should be noted that, a plurality of NVMeSSDs may be mounted on each storage array card; and before each NVMeSSD maps the control address space thereof to the storage array card by the address mapping logic, the storage array card needs to initially configure a PCIe bus connected to the NVMeSSD, scan each NVMeSSD mounted thereon, and then performs BAR (Base Address Register) space mapping for each NVMeSSD. That is, the storage array card maps, by its own address mapping logic, the control address space of each NVMeSSD to itself, that is, the hard disk control mapping address of each NVMeSSD is generated. The host 92 can write the data transmission instruction to the hard disk control mapping address of a target NVMeSSD according to the hard disk control mapping address of each NVMeSSD in the storage array card.

Figure 3:
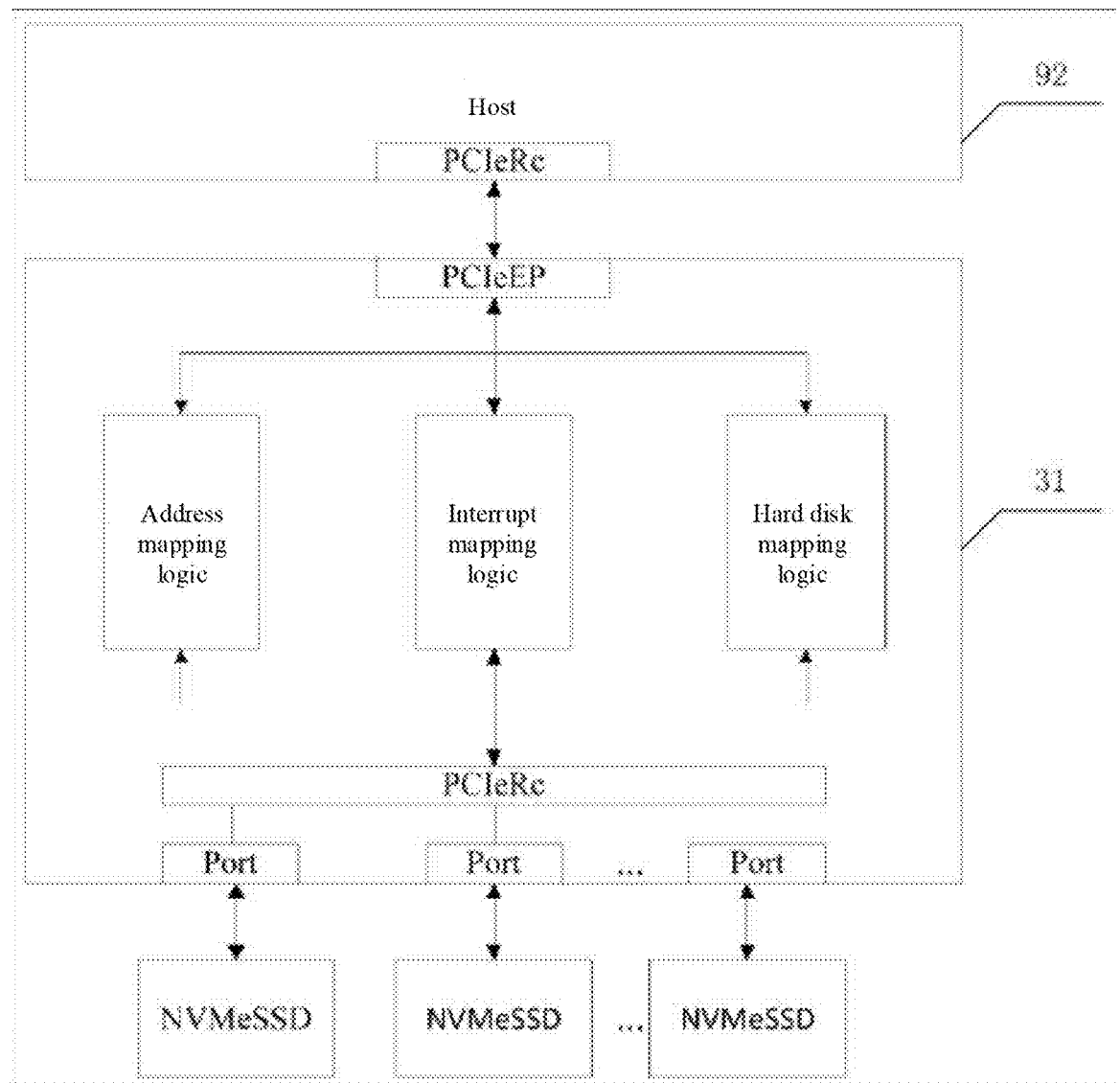
FIG. 3 is a schematic diagram of a connection structure of a storage array card provided according to the present disclosure.

It should be further noted that the storage array card in some embodiments of the present disclosure is an RAID controller. The RAID controller is connected to each NVMeSSD via a PCIe bus, i.e. a PCIeRC (PCIe Root Complex) controller, and the PCIeRC controller includes a plurality of PCIePorts, which can expand a plurality of NVMeSSDs. Please refer to FIG. 3, FIG. 3 is a schematic diagram of a connection structure of a storage array card provided according to the present disclosure. The PCIeRC of the host 92 is connected to a PCIeEP (PCIe endpoint device) of the storage array card.

Figure 4:
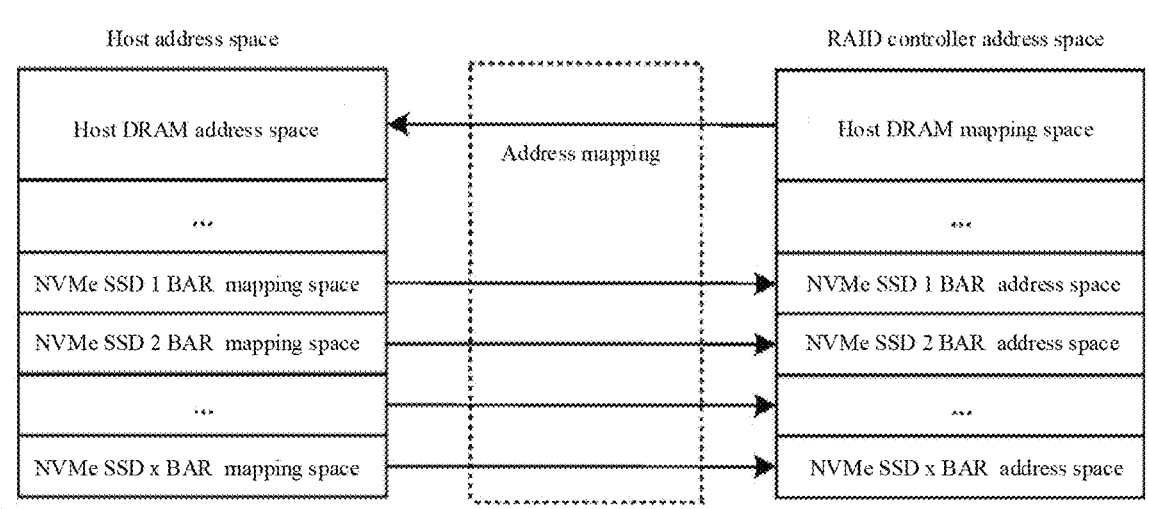
FIG. 4 is a schematic diagram of address mapping provided according to the present disclosure.

Please refer to FIG. 4, FIG. 4 is a schematic diagram of address mapping provided according to the present disclosure. The address space of the host 92 includes its own storage address space, i.e. HostDRAM address space, which after being mapped to the RAID controller, becomes the host storage mapping address, i.e. HostDRAM mapping space. When performing data transmission with the host 92, the NVMeSSD accesses the host storage mapping address, i.e. accessing the HostDRAM mapping space, and actually directly accesses the HostDRAM address space in the host 92. Moreover, an NVMeSSD 1BAR address space, an NVMeSSD 2BAR address space and an NVMeSSD xBAR address space in an RAID controller address space are actual control signal address spaces of the NVMeSSDs; and after mapping, when the host 92 accesses the hard disk control mapping address of the NVMeSSDs, i.e. the NVMeSSD 1BAR mapping space, the NVMeSSD 2BAR mapping space and the NVMeSSD xBAR mapping space, the host actually accesses the actual control signal address spaces of the NVMeSSDs, that is, directly accessing the NVMeSSD 1BAR address space, the NVMeSSD 2BAR address space and the NVMeSSD xBAR address space of the NVMeSSDs i.e. different address spaces of different NVMeSSDs.

It should be noted that the NVMeSSD in some embodiments of the present disclosure has its own controller, such as a DMA controller.

In summary, in some embodiments of the present disclosure, it is unnecessary to perform an intermediate data transmission instruction processing process on the storage array card, and it is also unnecessary to perform an intermediate data moving process on the storage array card, and data can be directly transmitted between the host 92 and the NVMeSSD, thereby increasing the efficiency of data transmission and reducing the performance requirements of the storage array card.

On the basis of some of the embodiments above:
  in an embodiment, the storage array card further includes interrupt mapping logic;
  before the data transmission instruction is sent to the NVMeSSD by the hard disk control mapping address in the storage array card, such that the NVMeSSD performs data transmission on the basis of the data transmission instruction and the host storage mapping address in the storage array card, the method further includes:
  one's own interrupt signal address space is mapped to the storage array card by the interrupt mapping logic of the storage array card, wherein the mapped interrupt signal address space is a host interrupt signal mapping address; and after the data transmission instruction is sent to the NVMeSSD by the hard disk control mapping address in the storage array card, such that the NVMeSSD performs data transmission on the basis of the data transmission instruction and the host storage mapping address in the storage array card, the method further includes:
  after an interrupt signal is written to the host interrupt signal mapping address by the interrupt mapping logic at the NVMeSSD, the interrupt signal is processed.

In an embodiment, the storage array card further includes interrupt mapping logic, and the host 92 can map its own interrupt signal address space to the storage array card by the interrupt logic. When the NVMeSSD needs to send an interrupt signal to the host 92, the interrupt signal is directly written into the host interrupt signal mapping address in the storage array card, such that the interrupt signal can be directly written into the interrupt signal address space of the host 92. The host 92 processes the interrupt signal after the interrupt signal is written into the interrupt signal address space thereof by the NVMeSSD, so as to realize direct transmission of the interrupt signal between the NVMeSSD and the host 92, without the need of indirect transmission via the storage array card, thereby increasing the signal transmission efficiency and the interrupt signal processing efficiency.

It should be noted that, the interrupt signal in some embodiments of the present disclosure may include but is not limited to an MSI/MSIX interrupt write operation or Pin interrupt. Specifically, by the interrupt mapping logic, the MSI/MSIX interrupt write operation or Pin interrupt outputted by the NVMeSSD can be mapped to an MSI/MSIX (MSI: Message Signaled Interrupts) write operation in the interrupt signal address space of the interrupt storage array card of the host 92.

In an embodiment, before the data transmission instruction is sent to the NVMeSSD by the hard disk control mapping address in the storage array card, such that the NVMeSSD performs data transmission on the basis of the data transmission instruction and the host storage mapping address in the storage array card, the method further includes:

an I/O queue is established, and a base address of the I/O queue is mapped to the storage array card by means of the address mapping logic of the storage array card;

the data transmission instruction is sent to the NVMeSSD by the hard disk control mapping address, such that the NVMeSSD acquires, from the I/O queue, a data transmission command corresponding to the data transmission instruction, and transmits data corresponding to the data transmission command to the host storage mapping address corresponding to the data transmission command; and after the interrupt signal is written to the host interrupt signal mapping address by the interrupt mapping logic at the NVMeSSD, the interrupt signal is processed, including:

at the NVMeSSD, the I/O queue is enabled, and the interrupt signal is processed when the interrupt signal is written to the host interrupt signal mapping address by the interrupt mapping logic.

In an embodiment, before the host 92 performs data transmission with the NVMeSSD, the I/O queue is established first, such that by the I/O queue, the host 92 sends to the NVMeSSD a data transmission command corresponding to specific data to be transmitted, or receives, on the basis of the I/O queue, an interrupt signal sent by the NVMeSSD to the host 92. Specifically, the host 92 can directly send an I/O (Input/Output) command, i.e. the data transmission command, to the NVMeSSD. Specifically, the host 92 establishes a data structure of the I/O queue in the storage address space thereof, i.e. HostDRAM; and the host 92 sends a command for requesting to establish the I/O queue of the NVMeSSD to the storage array card. First, the host 92 maps a base address of the I/O queue in the HostDRAM to the storage array card by the address mapping logic of the storage array card; and after the storage array card receives a command for establishing the I/O queue of the NVMeSSD, if the base address of the I/O queue sent by the host 92 is not translated into an address mapped by the address mapping logic, then the base address is translated into an address mapped by the address mapping logic. Specifically, the I/O queue is established for the NVMeSSD by NVMeSetFeature. Definitely, the host 92 may establish a plurality of I/O queues for the same NVMeSSD, and the total number of I/O queues of each NVMeSSD is not greater than the number of local I/O queues of the storage array card and the number of I/O queues reserved for the host 92; wherein the local I/O queues of the storage array card are I/O queues when data requires check calculation; and the I/O queues reserved for the host 92 are I/O queues that do not require check calculation, but allow for direct data transmission between the NVMeSSD and the host 92.

On this basis, by providing the I/O queue, the NVMeSSD can directly acquire the data transmission command generated by the host 92, which can increase the high efficiency and accuracy of transfer of the data transmission command during data transmission between the NVMeSSD and the host 92, thereby increasing the data transmission efficiency.

In an embodiment, the I/O queue includes a command completion queue and a command submission queue;

the data transmission instruction is sent to the NVMeSSD by the hard disk control mapping address, such that the NVMeSSD acquires, from the I/O queue, the data transmission command corresponding to the data transmission instruction, and transmits data corresponding to the data transmission command to the host storage mapping address corresponding to the data transmission command, including:

the data transmission instruction is sent to the NVMeSSD by the hard disk control mapping address, such that the NVMeSSD acquires, from the command submission queue, the data transmission command corresponding to the data transmission instruction, and transmits data corresponding to the data transmission command to the host storage mapping address corresponding to the data transmission command; and at the NVMeSSD, the I/O queue is enabled, and the interrupt signal is processed when the interrupt signal is written to the host interrupt signal mapping address by the interrupt mapping logic, including:

at the NVMeSSD, the command completion queue is enabled, and the interrupt signal is processed when the interrupt signal is written to the host interrupt signal mapping address by the interrupt mapping logic.

In an embodiment, the I/O queue established by the host 92 includes a command completion queue and a command submission queue; wherein the command submission queue includes a plurality of data transmission commands, wherein the data transmission commands can point to the storage address space in the host 92, the storage address space in the NVMeSSD and data to be transmitted in each storage address space. After the host 92 writes a data transmission instruction into the control address space of the NVMeSSD, according to the data transmission instruction, the NVMeSSD acquires, from the command submission queue, a data transmission command corresponding to the data transmission instruction, to determine the storage address space in the host 92 in which data moving is required currently and a storage address space in which data moving is required in the NVMeSSD itself.

Moreover, when the NVMeSSD completes data moving corresponding to the data transmission command, the command completion queue can be enabled, and the interrupt signal is written into the interrupt signal address space of the host 92. After identifying that the command completion queue is enabled, the host 92 processes the interrupt signal in the interrupt signal address space thereof.

An SQ queue is the command submission queue, and a CQ queue is the command completion queue, i.e. a queue for receiving the interrupt signal of the NVMeSSD; and when enabling the command completion queue, the NVMeSSD specifically enables the CQ queue.

In some embodiments, before the data transmission instruction is sent to the NVMeSSD by the hard disk control mapping address, such that the NVMeSSD acquires, from the command submission queue, the data transmission command corresponding to the data transmission instruction, and transmits data corresponding to the data transmission command to the host storage mapping address corresponding to the data transmission command, the method further includes:

various data transmission commands are written into the command submission queue.

In an embodiment, the host 92 writes various data transmission commands into the command submission queue, and after detecting an input of a data transmission instruction, the NVMeSSD acquires a data transmission command corresponding to the data transmission instruction from a pre-established command submission queue, i.e. the SQ queue. The data transmission command includes data to be transmitted which should be read or written, and addresses where data transmission is to be performed in the host 92 and the NVMeSSD, such that the NVMeSSD controller executes a corresponding data transmission operation.

In an embodiment, the storage array card further includes hard disk control logic, configured to establish a management command queue for the NVMeSSD on the basis of the I/O queue;

the data transmission instruction is sent to the NVMeSSD by the hard disk control mapping address, such that the NVMeSSD acquires, from the I/O queue, the data transmission command corresponding to the data transmission instruction, and transmits data corresponding to the data transmission command to the host storage mapping address corresponding to the data transmission command, including:

after the storage array card establishes the management command queue for the NVMeSSD, the data transmission instruction is sent to the NVMeSSD by the hard disk control mapping address, such that the NVMeSSD acquires, from the I/O queue, a data transmission command corresponding to the data transmission instruction on the basis of the management command queue, and transmits data corresponding to the data transmission command to the host storage mapping address corresponding to the data transmission command; and at the NVMeSSD, the I/O queue is enabled, and the interrupt signal is processed when the interrupt signal is written to the host interrupt signal mapping address by the interrupt mapping logic, including:

after the storage array card establishes the management command queue for the NVMeSSD, the I/O queue is enabled at the NVMeSSD by the management command queue, and the interrupt signal is processed when the interrupt signal is written to the host interrupt signal mapping address by the interrupt mapping logic.

In an embodiment, after the host 92 establishes the I/O queue for the NVMeSSD, in order to ensure that the NVMeSSD can directly acquire the data transmission command in the I/O queue or enable the I/O queue, the storage array card also establishes THE management command queue for the NVMeSSD on the basis of the I/O queue by its own hard disk control logic. On this basis, the NVMeSSD is indirectly "connected" to the I/O queue established by the host 92 by the management command queue, such that the NVMeSSD can acquire the data transmission command in the I/O queue according to the management command queue, and can enable the I/O queue by the management command queue when sending the interrupt signal to the host 92, thereby increasing the data transmission efficiency.

It should be noted that, in the host 92, one or more I/O queues may be set for each NVMeSSD, and there is only one management queue of each NVMeSSD in the storage array card.

Figure 5:
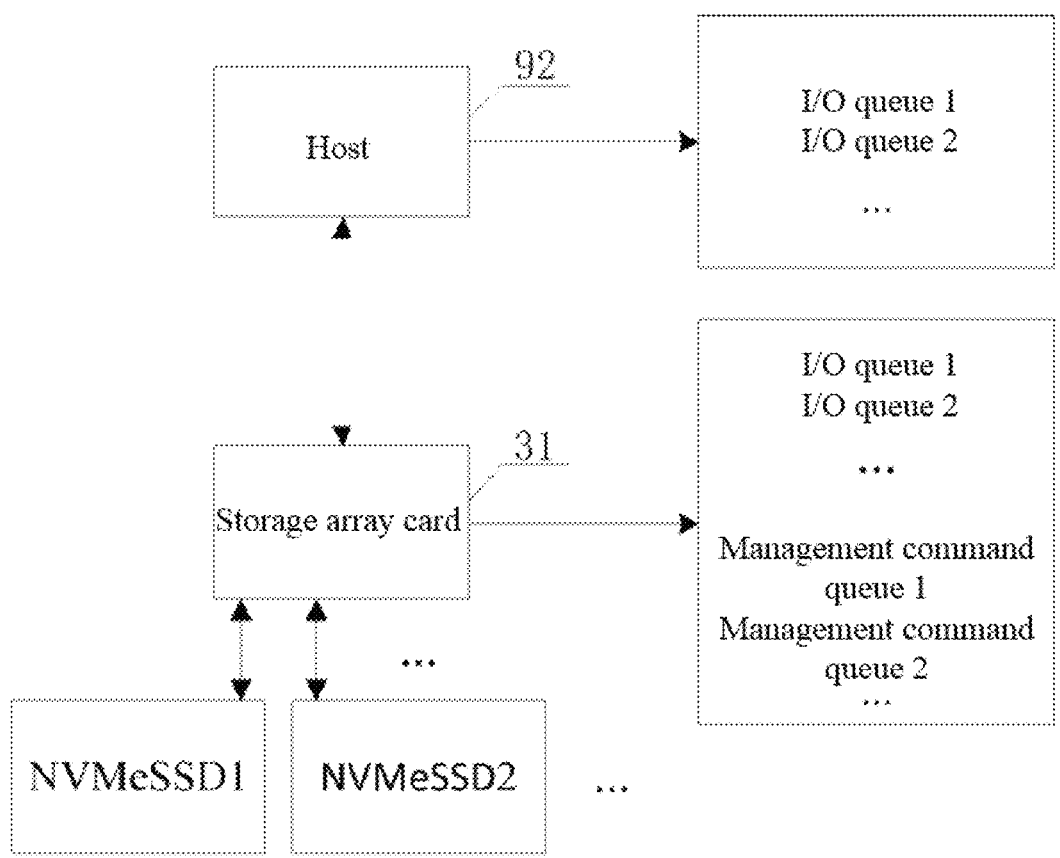
FIG. 5 is a schematic diagram of queues provided according to the present disclosure.

Please refer to FIG. 5, FIG. 5 is a schematic diagram of queues provided according to the present disclosure. A base address of an I/O queue established by the host 92 for each NVMeSSD is located in the host 92 and mapped to the storage array card by the address mapping logic; and an address of a management command queue established by the storage array card for each NVMeSSD is located in the storage array card. In FIG. 5, an I/O queue 1 is an I/O queue established by the host 92 for an NVMeSSD1, an I/O queue 2 is an I/O queue established by the host 92 for an NVMeSSD2, a management command queue 1 is a management command queue established by the storage array card for the NVMeSSD1, and a management command queue 2 is a management command queue established by the storage array card for the NVMeSSD2. Of course, this is taken as an example in FIG. 5, and the host 92 may establish a plurality of I/O queues for each NVMeSSD.

In an embodiment, before the data transmission instruction is sent to the NVMeSSD by the hard disk control mapping address in the storage array card, such that the NVMeSSD performs data transmission on the basis of the data transmission instruction and the host storage mapping address in the storage array card, the method further includes:

when the data transmission instruction is a write data instruction, it is determined whether data corresponding to the write data instruction is data to be checked;

in the case that it is determined that the data corresponding to the write data instruction is data to be checked, the write data instruction is sent to the storage array card, such that the storage array card receives and checks the data corresponding to the write data instruction in the host 92, and writes the checked data corresponding to the write data instruction into the NVMeSSD; and in the case that it is determined that the data corresponding to the write data instruction is not data to be checked, the step that the data transmission instruction is sent to the NVMeSSD by the hard disk control mapping address in the storage array card, such that the NVMeSSD performs data transmission on the basis of the data transmission instruction and the host storage mapping address in the storage array card is entered.

Figure 6:
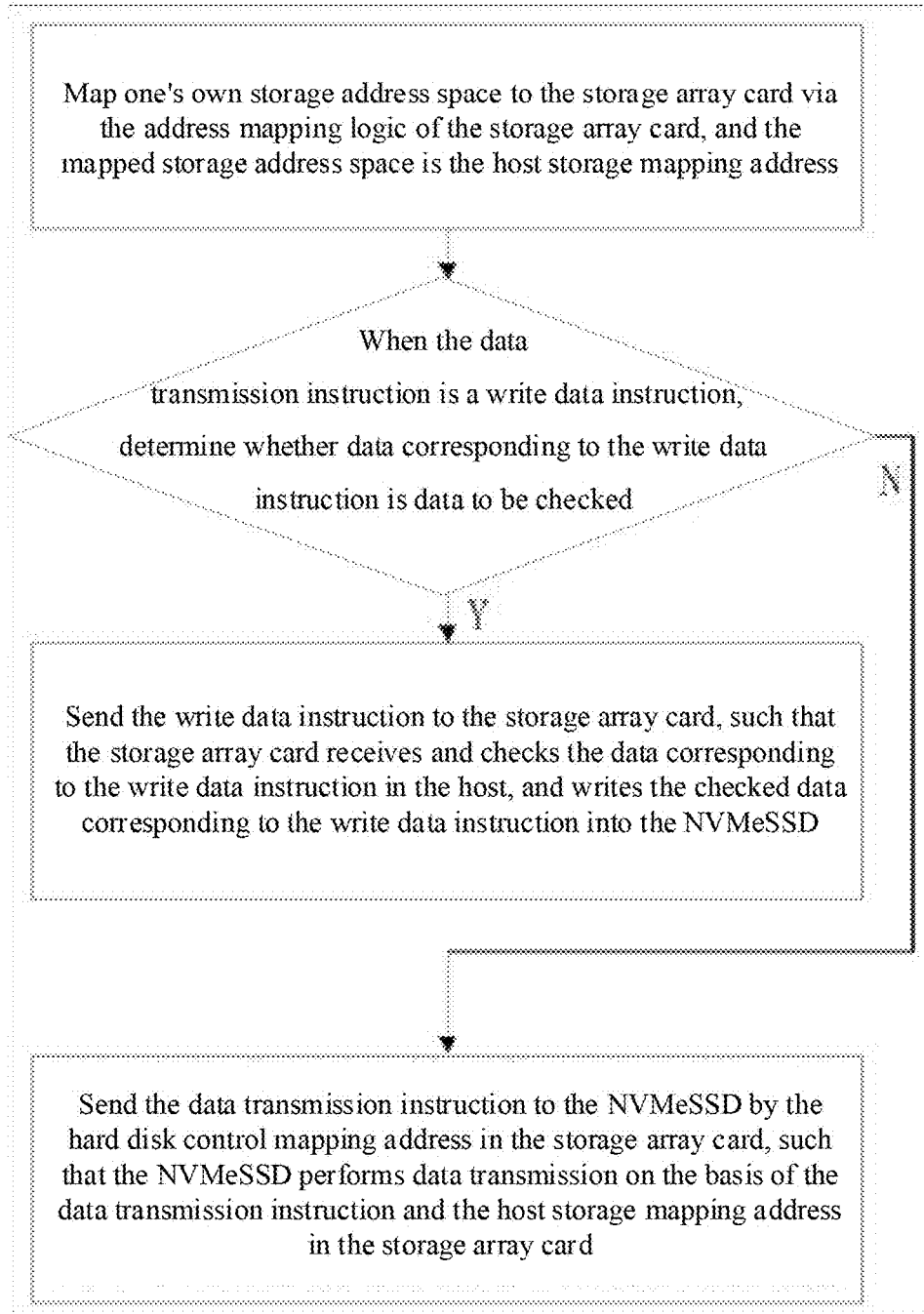
FIG. 6 is a flowchart of data transmission in which a data transmission instruction is a write data instruction provided according to the present disclosure.

Please refer to FIG. 6, FIG. 6 is a flowchart of data transmission in which the data transmission instruction is a write data instruction provided according to the present disclosure.

In an embodiment, Considering that when data is transmitted between the host 92 and the NVMeSSD, some data may be directly transmitted between the host 92 and the NVMeSSD without being checked, e.g. RAID 0/RAID 1/RAID 10, while some data may be transmitted to the host 92 or the NVMeSSD only after being checked, e.g. RAID 5/RAID 6/RAID 50/RAID 60. Moreover, the data transmission instruction sent by the host 92 also includes a write data instruction and a read data instruction, wherein the read data instruction is to read data from the NVMeSSD by the host 92, and the write data instruction is to write data into the NVMeSSD from the host 92, for storage.

When the data transmission instruction in some embodiments of the present disclosure is the write data instruction, and data corresponding to the write data instruction is data to be checked, the host 92 needs to send the write data instruction to the storage array card; and the storage array card analyzes the write data instruction, to acquire data corresponding to the write data instruction from the host 92 and checks same, and after checking, the data is written into the NVMeSSD, that is, intermediate participation of the storage array card is needed. If the data corresponding to the write data instruction is not data to be checked, that is, the data may be directly transmitted between the host 92 and the NVMeSSD, the host 92 may directly write the write data instruction into the hard disk control mapping address of the NVMeSSD, such that the NVMeSSD controller in the NVMeSSD directly acquires, from the host storage mapping address, the data corresponding to the write data instruction, and writes same into the storage space thereof, thereby implementing direct moving of data in the host 92 to the NVMeSSD, and increasing the data transmission efficiency.

In an embodiment, the apparatus for data transmission includes a plurality of NVMeSSDs connected to the storage array card;
- before the data transmission instruction is sent to the NVMeSSD by the hard disk control mapping address in the storage array card, such that the NVMeSSD performs data transmission on the basis of the data transmission instruction and the host storage mapping address in the storage array card, the method further includes:
- when the data transmission instruction is a read data instruction, it is determined whether data corresponding to the read data instruction is data to be checked;
- in the case that the data is data to be checked, it is determined whether each NVMeSSD connected to the storage array card is in a normal state;
- in the case that the data is not data to be checked or each NVMeSSD is in the normal state, the read data instruction is sent to a target NVMeSSD by the hard disk control mapping address in the storage array card, such that the target NVMeSSD writes data corresponding to the read data instruction into the host storage mapping address in the storage array card;
- in the case that not all the NVMeSSDs are in the normal state, it is determined whether the target NVMeSSD is in the normal state;
- in the case that the target NVMeSSD is in the normal state, the read data instruction is sent to the target NVMeSSD by the hard disk control mapping address in the storage array card, such that the target NVMeSSD writes data corresponding to the read data instruction into the host storage mapping address in the storage array card; and
- if the target NVMeSSD is not in the normal state, the read data instruction is sent to the storage array card, such that the storage array card receives and checks data corresponding to the read data instruction in the target NVMeSSD, and sends the checked data corresponding to the read data instruction to the host 92.

Figure 7:
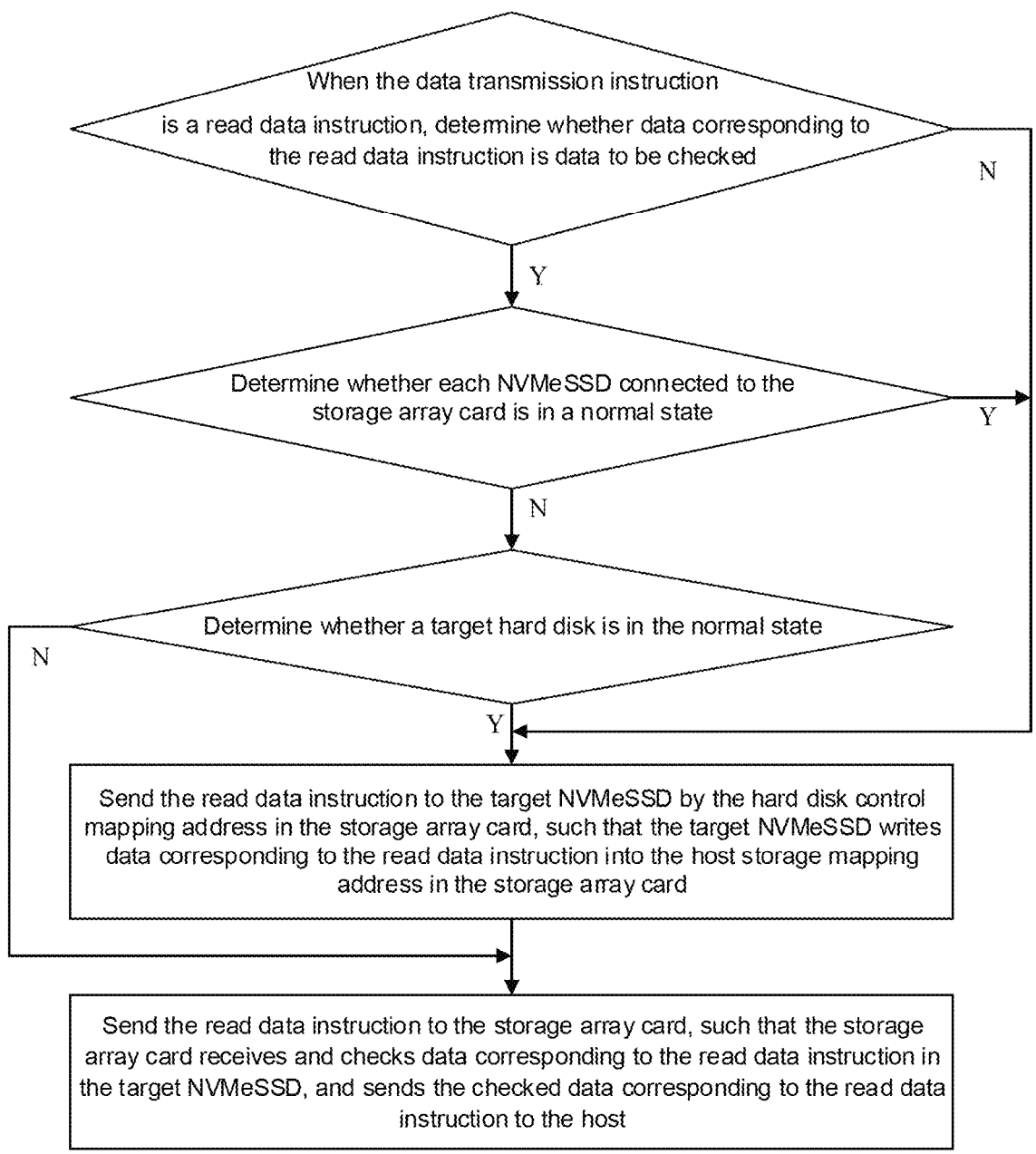
FIG. 7 is a flowchart of data transmission in which a data transmission instruction is a read data instruction provided according to the present disclosure.

Please refer to FIG. 7, FIG. 7 is a flowchart of data transmission in which the data transmission instruction is a read data instruction provided according to the present disclosure.

When the data transmission instruction is a read data instruction, the host 92 needs to read data in the NVMeSSD; likewise, if data corresponding to the read data instruction does not need to be checked, the host 92 may directly write the read data instruction into the hard disk control mapping address, thereby achieving direct data transmission between the host 92 and the NVMeSSD. In the case that the data corresponding to the read data instruction needs to be checked, the read data instruction is sent to the storage array card; in addition, as each storage array card can be connected to a plurality of NVMeSSDs, the storage array card needs to first determine whether each NVMeSSD connected thereto is normal. If each of the NVMeSSDs is normal, the host 92 may directly write the read data instruction into the hard disk control mapping address, thereby achieving direct data transmission between the host 92 and the NVMeSSD. Furthermore, if not all the NVMeSSDs are in the normal state, it is first determined whether a target NVMeSSD corresponding to the read data instruction is in the normal state, and if the target NVMeSSD corresponding to the read data instruction is in the normal state, the host 92 can also directly write the read data instruction into the hard disk control mapping address, thereby achieving direct data transmission between the host 92 and the NVMeSSD; and if the target NVMeSSD fails, the host 92 needs to send the read data instruction to the storage array card, such that the storage array card receives and checks the data corresponding to the read data instruction in the target NVMeSSD, and sends the checked data corresponding to the read data instruction to the host 92, thereby ensuring integrity of transmitted data.

It should be noted that when the read data instruction and the write data instruction of the host 92 are written into the hard disk control mapping address or sent to the storage array card, both the read data instruction and the write data instruction need to be split into a read data instruction or a write data instruction for the target NVMeSSD.

Figure 8:
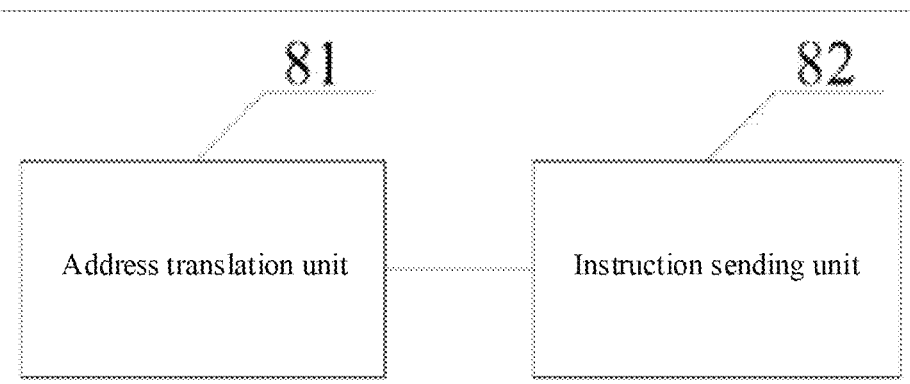
FIG. 8 is a schematic structural diagram of a system for data transmission provided according to the present disclosure.

Please refer to FIG. 8, FIG. 8 is a schematic structural diagram of a system for data transmission provided according to the present disclosure. Sid system is applied to a host 92 in an apparatus for data transmission, wherein the apparatus for data transmission includes a host 92, a storage array card 31 and NVMeSSDs which are connected in sequence, wherein connection between the host 92 and the storage array card 31 and connection between the storage array card 31 and the NVMeSSDs are achieved via PCIe buses; the storage array card 31 includes address mapping logic, each NVMeSSD maps its own control address space to the storage array card 31 via the address mapping logic of the storage array card 31, and the mapped control address space is a hard disk control mapping address; the system includes:
- an address translation unit 81, configured to map one's own storage address space to the storage array card by the address mapping logic of the storage array card, wherein the mapped storage address space is a host storage mapping address; and
- an instruction sending unit 82, configured to send a data transmission instruction to the NVMeSSD by the hard disk control mapping address in the storage array card, such that the NVMeSSD performs data transmission on the basis of the data transmission instruction and the host storage mapping address in the storage array card.

For introduction of the system for data transmission provided in some embodiments of the present disclosure, reference may be made to the method embodiments above, and details will not be repeatedly described in some embodiments of the present disclosure.

Figure 9:
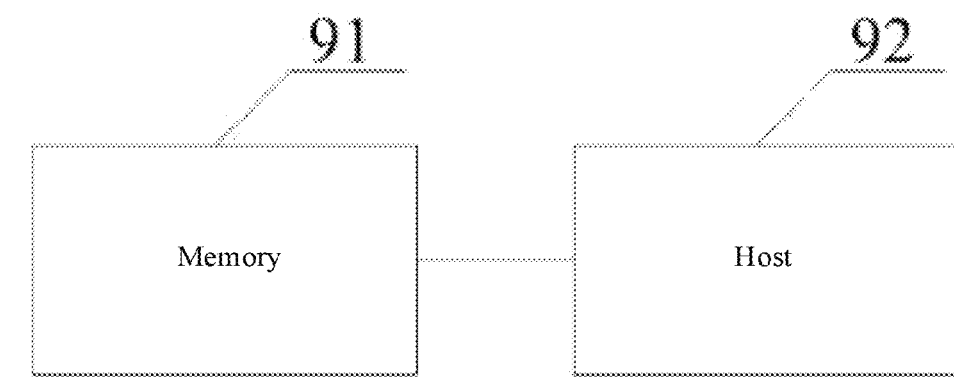
FIG. 9 is a schematic structural diagram of an apparatus for data transmission provided according to the present disclosure.

Please refer to FIG. 9, FIG. 9 is a schematic structural diagram of an apparatus for data transmission provided according to the present disclosure. Said apparatus includes:
- a memory 91, for storing a computer program; and
- a host 92, for implementing steps of the described method for data transmission when executing the computer program.

In an embodiment, said apparatus further includes: a storage array card 31, connected to the host 92 via a PCIe bus, and configured to receive a host storage mapping address of the host 92 and a hard disk control mapping address of each NVMeSSD; and
NVMeSSDs, connected to the storage array card 31 via PCIe buses, and configured to store data and perform data transmission with the host 92 on the basis of the host storage mapping address in the storage array card 31.

In an embodiment, the storage array card 31 includes address mapping logic, which is specifically configured to receive, by the address mapping logic, a storage address space mapped by the host 92, and receive, by the address mapping logic, a control address space mapped by the NVMeSSD.

In an embodiment, the storage array card 31 further includes interrupt mapping logic, which is further configured to receive an interrupt signal address space of the host 92 by the interrupt mapping logic.

In an embodiment, the storage array card 31 further includes hard disk control logic, which is configured to establish a management command queue for the NVMeSSD after receiving an I/O queue established by the host 92, such that the NVMeSSD acquires, from the I/O queue, a data transmission command corresponding to a data transmission instruction on the basis of the management command queue, or enable the I/O queue on the basis of the management command queue.

In an embodiment, the I/O queue includes a command completion queue and a command submission queue;

the NVMeSSD is specifically configured to store data, acquire a data transmission command corresponding to the data transmission instruction from the command submission queue on the basis of the management command queue, or enable the command completion queue on the basis of the management command queue, so as to perform data transmission with the host 92.

In some embodiments, the storage array card 31 includes address mapping logic, interrupt mapping logic and hard disk control logic, which can not only achieve direct data interaction between the storage address spaces of the host 92 and the NVMeSSD, but can also allow for direct transmission of data transmission instruction, data transmission command and interrupt signal between the host 92 and the NVMeSSD, thereby increasing the data transmission efficiency.

For specific introduction of the apparatus for data transmission provided in some embodiments of the present disclosure, reference may be made to the method embodiments above, and details will not be repeatedly described in some embodiments of the present disclosure.

In an embodiment of the present disclosure, a non-transitory readable storage medium stores a computer program, and when the computer program is executed by the host 92, steps of the method for data transmission above are implemented.

For introduction of the non-transitory readable storage medium provided in some embodiments of the present disclosure, reference may be made to the method embodiments above, and details will not be repeatedly described in some embodiments of the present disclosure.

It should also be noted that in the present description, relational terms such as first and second, etc. are only used to distinguish one entity or operation from another entity or operation, and do not necessarily require or imply any actual relationship or sequence between these entities or operations. Furthermore, terms "include", "including", or any other variations thereof are intended to cover a non-exclusive inclusion, so that a process, a method, an article, or a device that includes a series of elements not only includes those elements, but also includes other elements that are not explicitly listed, or further includes s inherent elements of the process, the method, the article, or the device. Without further limitation, an element defined by a sentence "including a . . . " does not exclude other same elements existing in the process, the method, the article, or the device that includes the element.

The illustration above of the disclosed embodiments enable a person skilled in the art to implement or use some embodiments of the present disclosure. Various modifications to these embodiments will be apparent to a person skilled in the art. The general principles defined herein may be implemented in other embodiments without departing from the spirit or scope of the present disclosure. Accordingly, the present disclosure will not be limited to these embodiments shown herein, but needs to comply with the widest scope consistent with the principles and novel features disclosed herein.

What is claimed is:

1. A method for data transmission, applied to a host in an apparatus for data transmission, wherein the method comprises:
    exchanging, via a PCIe bus, data with a storage array card in the data transmission apparatus; wherein the storage array card comprises address mapping logic;
    exchanging, through the storage array card, data with each NVMeSSD in the data transmission apparatus via a PCIe bus;
    mapping, through the NVMeSSD, a control address space of the NVMeSSD to the storage array card through the address mapping logic of the storage array card, and using the mapped control address space as a hard disk control mapping address;
    mapping, through the address mapping logic of the storage array card, on a storage address space of the NVMeSSD to the storage array card, wherein the mapped storage address space is a host storage mapping address; and
    sending, through the hard disk control mapping address in the storage array card, a data transmission instruction to the NVMeSSD, such that the NVMeSSD performs data transmission on the basis of the data transmission instruction and the host storage mapping address in the storage array card.

2. The method for data transmission according to claim 1, wherein an address pointer of the data transmission instruction points to the host storage mapping address, mapped through the address mapping logic, of the host.

3. The method for data transmission according to claim 1, wherein the storage array card further comprises interrupt mapping logic;
    before sending the data transmission instruction to the NVMeSSD through the hard disk control mapping address in the storage array card, such that the NVMeSSD performs data transmission on the basis of the data transmission instruction and the host storage mapping address in the storage array card, the method further comprises:
    mapping an interrupt signal address space of the NVMeSSD to the storage array card through the interrupt mapping logic of the storage array card, wherein the mapped interrupt signal address space is a host interrupt signal mapping address; and
    after sending the data transmission instruction to the NVMeSSD through the hard disk control mapping address in the storage array card, such that the NVMeSSD performs data transmission on the basis of the data transmission instruction and the host storage mapping address in the storage array card, the method further comprises:
    processing the interrupt signal, after an interrupt signal is written to the host interrupt signal mapping address through the interrupt mapping logic at the NVMeSSD.

4. The method for data transmission according to claim 3, wherein before sending the data transmission instruction to the NVMeSSD through the hard disk control mapping address in the storage array card, such that the NVMeSSD performs data transmission on the basis of the data transmission instruction and the host storage mapping address in the storage array card, the method further comprises:

establishing an I/O queue, and mapping a base address of the I/O queue to the storage array card through means of the address mapping logic of the storage array card; and sending the data transmission instruction to the NVMeSSD through the hard disk control mapping address, such that the NVMeSSD acquires, from the I/O queue, a data transmission command corresponding to the data transmission instruction, and transmits data corresponding to the data transmission command to the host storage mapping address corresponding to the data transmission command; and processing the interrupt signal, after the interrupt signal is written to the host interrupt signal mapping address through the interrupt mapping logic at the NVMeSSD, comprising:

enabling the I/O queue at the NVMeSSD, and processing the interrupt signal when the interrupt signal is written to the host interrupt signal mapping address through the interrupt mapping logic.

5. The method for data transmission according to claim 4, wherein establishing an I/O queue comprises:

establishing, through the host, at least one I/O queue for the same NVMeSSD; wherein the total number of I/O queues of the NVMeSSD is not greater than the number of local I/O queues of the storage array card and the number of I/O queues reserved for the host.

6. The method for data transmission according to claim 4, wherein the I/O queue comprises a command completion queue and a command submission queue;

sending the data transmission instruction to the NVMeSSD through the hard disk control mapping address, such that the NVMeSSD acquires, from the I/O queue, a data transmission command corresponding to the data transmission instruction, and transmits data corresponding to the data transmission command to the host storage mapping address corresponding to the data transmission command, comprising:

sending the data transmission instruction to the NVMeSSD through the hard disk control mapping address, such that the NVMeSSD acquires, from the command completion queue, a data transmission command corresponding to the data transmission instruction, and transmits data corresponding to the data transmission command to the host storage mapping address corresponding to the data transmission command; and enabling the I/O queue at the NVMeSSD, and processing the interrupt signal when the interrupt signal is written to the host interrupt signal mapping address through the interrupt mapping logic, comprising:

enabling the command completion queue at the NVMeSSD, and processing the interrupt signal when the interrupt signal is written to the host interrupt signal mapping address through the interrupt mapping logic.

7. The method for data transmission according to claim 6, wherein before sending the data transmission instruction to the NVMeSSD through the hard disk control mapping address, such that the NVMeSSD acquires, from the command completion queue, the data transmission command corresponding to the data transmission instruction, and transmits data corresponding to the data transmission command to the host storage mapping address corresponding to the data transmission command, the method further comprises:

writing various data transmission commands into the command submission queue.

8. The method for data transmission according to claim 6, wherein the data transmission command comprises data to be transmitted, and addresses where data transmission is to be performed in the host and the NVMeSSD.

9. The method for data transmission according to claim 4, wherein the storage array card further comprises hard disk control logic, configured to establish a management command queue for the NVMeSSD on the basis of the I/O queue;

sending the data transmission instruction to the NVMeSSD through the hard disk control mapping address, such that the NVMeSSD acquires, from the I/O queue, the data transmission command corresponding to the data transmission instruction, and transmits data corresponding to the data transmission command to the host storage mapping address corresponding to the data transmission command, comprising:

after the storage array card establishes the management command queue for the NVMeSSD, sending the data transmission instruction to the NVMeSSD through the hard disk control mapping address, such that the NVMeSSD acquires, from the I/O queue, a data transmission command corresponding to the data transmission instruction on the basis of the management command queue, and transmits data corresponding to the data transmission command to the host storage mapping address corresponding to the data transmission command; and enabling the I/O queue at the NVMeSSD, and processing the interrupt signal when the interrupt signal is written to the host interrupt signal mapping address through the interrupt mapping logic, comprising:

enabling the I/O queue at the NVMeSSD through the management command queue, after the storage array card establishes the management command queue for the NVMeSSD, and processing the interrupt signal when the interrupt signal is written to the host interrupt signal mapping address through the interrupt mapping logic.

10. The method for data transmission according to claim 9, wherein there is one management command queue of the NVMeSSD in the storage array card.

11. The method for data transmission according to claim 1, wherein before sending the data transmission instruction to the NVMeSSD through the hard disk control mapping address in the storage array card, such that the NVMeSSD performs data transmission on the basis of the data transmission instruction and the host storage mapping address in the storage array card, the method further comprises:

determining whether data corresponding to the write data instruction is data to be checked, when the data transmission instruction is a write data instruction;

sending the write data instruction to the storage array card, in a case that determined the data corresponding to the write data instruction is data to be checked, such that the storage array card receives and checks the data corresponding to the write data instruction in the host, and writes the checked data corresponding to the write data instruction into the NVMeSSD; and proceeding to the step of sending the data transmission instruction to the NVMeSSD, through the hard disk control mapping address in the storage array card, in a case that determined the data corresponding to the write data instruction is not data to be checked, such that the NVMeSSD performs data transmission on the basis of the data transmission instruction and the host storage mapping address in the storage array card.

12. The method for data transmission according to claim 11, wherein proceeding to the step of sending the data transmission instruction to the NVMeSSD through the hard disk control mapping address in the storage array card, comprising:
writing the write data instruction into the hard disk control mapping address of the NVMeSSD.

13. The method for data transmission according to claim 1, wherein the apparatus for data transmission comprises a plurality of NVMeSSDs connected to the storage array card;
after sending the data transmission instruction to the NVMeSSD through the hard disk control mapping address in the storage array card, such that the NVMeSSD performs data transmission on the basis of the data transmission instruction and the host storage mapping address in the storage array card, the method further comprises:
determining whether data corresponding to the read data instruction is data to be checked, when the data transmission instruction is a read data instruction;
determining whether each NVMeSSD connected to the storage array card is in a normal state, in a case that the data is data to be checked;
sending the read data instruction to a target NVMeSSD, through the hard disk control mapping address in the storage array card, in a case that the data is not data to be checked or each NVMeSSD is in the normal state, such that the target NVMeSSD writes data corresponding to the read data instruction into the host storage mapping address in the storage array card;
determining whether the target NVMeSSD is in the normal state, in a case that not all the NVMeSSDs are in the normal state;
sending the read data instruction to the target NVMeSSD, through the hard disk control mapping address in the storage array card, in a case that the target NVMeSSD is in the normal state, such that the target NVMeSSD writes data corresponding to the read data instruction into the host storage mapping address in the storage array card; and
sending the read data instruction to the storage array card, in a case that the target NVMeSSD is not in the normal state, such that the storage array card receives and checks data corresponding to the read data instruction in the target NVMeSSD, and sends the checked data corresponding to the read data instruction to the host.

14. The method for data transmission according to claim 13, wherein the step of sending the read data instruction to the target NVMeSSD through the hard disk control mapping address in the storage array card, comprising:
writing the read data instruction into the hard disk control mapping address.

15. The method for data transmission according to claim 1, wherein a plurality of the NVMeSSDs are mounted on the storage array card.

16. The method for data transmission according to claim 15, wherein the NVMeSSDs are mounted to the storage array card through the following method:
configuring initially, through the storage array card, PCIe buses connected to the NVMeSSDs;
scanning, through the storage array card, at least one of the NVMeSDDs; and
performing, through the storage array card, base address register space mapping for each of the NVMeSSDs respectively, so as to map a control address space of the NVMeSSD to the storage array card through the address mapping logic of the storage array card, and generate the hard disk control mapping address of the NVMeSSD.

17. The method for data transmission according to claim 15, wherein the storage array card is connected to the NVMeSSD via a PCIe Root Complex controller.

18. An electronic device, comprising:
a memory, for storing a computer program; and
a host, for executing the computer program to; exchange, via a PCIe bus, data with a storage array card in the data transmission apparatus; wherein the storage array card comprises address mapping logic;
exchange, through the storage array card, data with each NVMeSSD in the data transmission apparatus via a PCIe bus;
map, through the NVMeSSD, a control address space of the NVMeSSD to the storage array card through the address mapping logic of the storage array card, and use the mapped control address space as a hard disk control mapping address;
map, through the address mapping logic of the storage array card, on a storage address space of the NVMeSSD to the storage array card, wherein the mapped storage address space is a host storage mapping address; and
send, through the hard disk control mapping address in the storage array card, a data transmission instruction to the NVMeSSD, such that the NVMeSSD performs data transmission on the basis of the data transmission instruction and the host storage mapping address in the storage array card.

19. A non-transitory readable storage medium, wherein the non-transitory readable storage medium stores a computer program, and when a processor executes the computer program to:
exchange, via a PCIe bus, data with a storage array card in the data transmission apparatus; wherein the storage array card comprises address mapping logic;
exchange, through the storage array card, data with each NVMeSSD in the data transmission apparatus via a PCIe bus;
map, through the NVMeSSD, a control address space of the NVMeSSD to the storage array card through the address mapping logic of the storage array card, and use the mapped control address space as a hard disk control mapping address;
map, through the address mapping logic of the storage array card, on a storage address space of the NVMeSSD to the storage array card, wherein the mapped storage address space is a host storage mapping address; and
send, through the hard disk control mapping address in the storage array card, a data transmission instruction to the NVMeSSD, such that the NVMeSSD performs data transmission on the basis of the data transmission instruction and the host storage mapping address in the storage array card.

20. The electronic device according to claim 18, wherein the storage array card further comprises interrupt mapping logic;
before sending the data transmission instruction to the NVMeSSD through the hard disk control mapping address in the storage array card, such that the NVMeSSD performs data transmission on the basis of the data transmission instruction and the host storage mapping address in the storage array card, the host further executes the computer program to:

map an interrupt signal address space of the NVMeSSD to the storage array card through the interrupt mapping logic of the storage array card, wherein the mapped interrupt signal address space is a host interrupt signal mapping address; and after sending the data transmission instruction to the NVMeSSD through the hard disk control mapping address in the storage array card, such that the NVMeSSD performs data transmission on the basis of the data transmission instruction and the host storage mapping address in the storage array card, the host further executes the computer program to:

process the interrupt signal, after an interrupt signal is written to the host interrupt signal mapping address through the interrupt mapping logic at the NVMeSSD.

* * * * *